US010134069B1

United States Patent
Lake et al.

(10) Patent No.: US 10,134,069 B1
(45) Date of Patent: Nov. 20, 2018

(54) SELECTIVELY UNLOCKING AN OPAQUE TRANSACTION FOR SPECIFIED USER GROUPS

(71) Applicant: priceline.com LLC, Norwalk, CT (US)

(72) Inventors: Scott B. Lake, Bethel, CT (US); John Caine, Bridgeport, CT (US)

(73) Assignee: priceline.com LLC, Norwalk, CT (US)

( * ) Notice: Subject to any disclaimer, the term of this patent is extended or adjusted under 35 U.S.C. 154(b) by 338 days.

(21) Appl. No.: 14/733,442

(22) Filed: Jun. 8, 2015

(51) Int. Cl.
*G06Q 30/00* (2012.01)
*G06Q 30/06* (2012.01)
*G06Q 50/14* (2012.01)
*G06F 17/30* (2006.01)
*G06Q 10/02* (2012.01)
*G06Q 30/02* (2012.01)

(52) U.S. Cl.
CPC ... *G06Q 30/0611* (2013.01); *G06F 17/30522* (2013.01); *G06Q 10/02* (2013.01); *G06Q 30/0226* (2013.01); *G06Q 30/0619* (2013.01); *G06Q 30/0641* (2013.01); *G06Q 50/14* (2013.01); *G06Q 30/02* (2013.01); *G06Q 30/0269* (2013.01)

(58) Field of Classification Search
None
See application file for complete search history.

(56) References Cited

U.S. PATENT DOCUMENTS

| | | | | |
|---|---|---|---|---|
| 7,614,552 B2 * | 11/2009 | Roseman | ............... | G06Q 30/02 235/383 |
| 8,458,021 B1 * | 6/2013 | Bous | .................. | G06Q 30/0635 705/14.1 |
| 2014/0095224 A1 * | 4/2014 | Vernitsky | ............... | G06Q 10/02 705/5 |
| 2014/0108067 A1 * | 4/2014 | Gluhovsky | ............ | G06Q 10/02 705/5 |
| 2014/0129372 A1 * | 5/2014 | Kalnsay | ............. | G06Q 30/0631 705/26.7 |
| 2015/0220836 A1 * | 8/2015 | Wilson | ............... | G06Q 30/0631 706/46 |
| 2016/0180434 A1 * | 6/2016 | Knight | .............. | G06F 17/30522 705/26.63 |

OTHER PUBLICATIONS

Schmeing, Tobias, Knowledge-based Dynamic Packaging Model, Dec. 26, 2006, Management of Innovation and Technology, 2006 IEEE International Conference, p. 1085-1089.*

* cited by examiner

*Primary Examiner* — William J Allen
*Assistant Examiner* — Timothy J Kang
(74) *Attorney, Agent, or Firm* — Hickman Palermo Becker Bingham LLP

(57) ABSTRACT

Methods, computer systems, and stored instructions are provided for improving opaque transactions where the identity of the seller is not revealed to the user until after the user purchases an item from the seller. In response to a conditional purchase offer received from the user, a subset of travel items are selected. An eligibility of the user for enhanced information such as a discounted price and/or an identity of at least one of the sellers of the subset of travel items is determined. Based on the eligibility of the user, the user is matched to one or more pieces of enhanced information. A user interface including an enhanced description of a travel item and a limited description of remaining travel items is provided. In response to a user selection of a travel item, a purchase transaction is completed between the user and the seller of the selected travel item.

20 Claims, 9 Drawing Sheets

SELECTIVELY UNLOCKING AN OPAQUE TRANSACTION FOR SPECIFIED USER GROUPS

TECHNICAL FIELD

The present disclosure generally relates to computers and data processing systems that are configured to receive, process and display data relating to transactions in travel items. The present disclosure relates more specifically to computer-implemented computational techniques for presenting a travel item to a particular client computer in response to receiving a conditional offer to purchase a travel item.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In a traditional model of selling goods and services, the seller identifies to prospective buyers the identity of the service or good for sale and the price of the good or service. However, in opaque transactions, some merchants allow a buyer to submit a conditional purchase offer for a travel item without specifying the full identity of the item to the buyer before the offer. An example is the NAME YOUR OWN PRICE conditional purchase offer service commercially available from priceline.com LLC of Norwalk, Conn.

With this service, a conditional purchase offer is communicated by computer and specifies an offer to buy a travel item at a particular price if certain conditions are satisfied. The certain conditions relate to various attributes of the travel item that the buyer wishes to buy. In response to receiving the conditional purchase offer, a merchant computer selects an available travel item to allocate to the conditional purchase offer. Example systems for processing conditional purchase offers are described in U.S. Pat. Nos. 6,993,503, 7,516,089, 8,548,871. Other relevant implementations may include those in which the specific travel item is not disclosed prior to purchase, without regard to whether the customer specifies the price or the system specifies the price; that is, in some instances the service provider may disclose the price of an unspecified item.

The use of a conditional purchase offer provides multiple advantages. By submitting a conditional purchase offer, buyers are be able to purchase items at lower prices than otherwise possible. Additionally, sellers appreciate the fact that a buyer is unable to discover the identity of the item or the lowest price that the seller is willing to accept for the item until after the buyer's offer has been submitted.

However, one drawback of a conditional purchase offer system is that, in some cases, sellers cannot recognize or reward certain buyers who have previously purchased a travel item from the seller. A related technical problem is that the server computers that form part of the seller's service are required to send an excessive amount of information over data networks even to the user computers of users who have previously engaged in transactions and therefore are more likely to complete a new transaction. For these user computers, network bandwidth is wasted, and more CPU cycles and memory allocation is necessary at the server computer, to undertake a fully opaque transaction when these user computers could efficiently participate in a partly opaque or non-opaque transaction under specified conditions.

SUMMARY OF THE INVENTION

The appended claims may serve as a summary of the invention.

DETAILED DESCRIPTION

Figure 1:
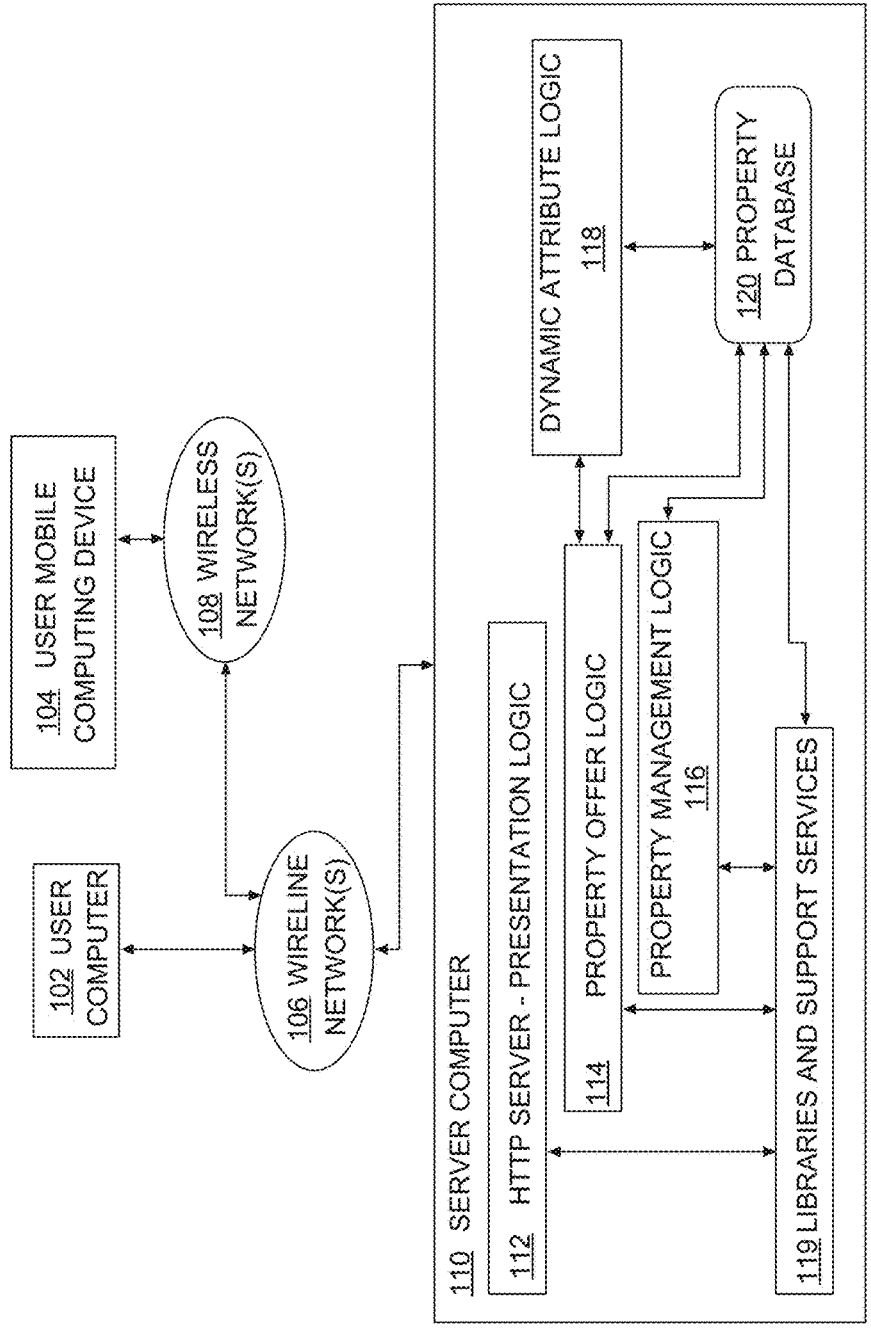
FIG. 1 illustrates an example networked data processing system that may be used in an embodiment and is configured to selectively unlock an opaque transaction for specified user groups.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 Overview
2.0 Example System for Unlocking Opaque Transactions
3.0 Example Methods for Unlocking Opaque Transactions
   3.1 Example Unlocked Opaque or Semi-Opaque Transaction
   3.2 Example Unlocked Retail Transaction
   3.3 Example Unlocked Cross-Sell
4.0 Hardware Overview
5.0 Extensions and Alternatives 1.0 Overview In an embodiment, an improved data processing system comprises a memory accessible to a server computer configured to maintain a plurality of available travel items and information about a plurality of users, the information comprising records indicating characteristics of a respective user of the plurality of users and past transactions initiated by the respective user; one or more non-transitory data storage media in the server computer storing property offer logic comprising one or more sequences of instructions which when executed cause the server computer to perform: using the server computer, obtaining, from a user device of the respective user, a conditional purchase offer to purchase a travel item, the conditional purchase offer including properties of the travel item; using the server computer, accessing the maintained plurality of available travel items from the memory and selecting a subset of travel items of the plurality of available travel items, each travel item of the subset of travel items having the properties included in the conditional purchase offer; using the server computer, accessing the information about the respective user from the memory and determining eligibility of the respective user for enhanced information of a first travel item of the subset of travel items; using the server computer, matching the user to the enhanced information of the first travel item based on the eligibility of the user; using the server computer, providing one or more sequences of instructions to the user device that, when executed, cause the user device to display the enhanced information of the first travel item of the subset of travel items and limited information of remaining travel items of the subset of travel items.

Using the improvements described herein, the server computers that form part of the seller's service are not required to send excess information over data networks to the user computers of users who have previously engaged in transactions and therefore are more likely to complete a new transaction. Instead, for these user computers, network bandwidth is conserved, and fewer CPU cycles and memory allocation are needed at the server computer, by causing display screens, messages and data computations to carry out a partly opaque or non-opaque transaction under specified conditions.

Closed user groups provide a way to increase computer efficiency in this way without causing a service provider to breach legal terms and conditions that govern its services. In the context of hotel bookings with opaque transactions, for example, typically a hotel property owner will impose rate parity agreements on its service providers to ensure that all services offering a particular hotel room are offering the same price, and/or will permit a hotel booking service provider to offer a discounted price for a hotel room night only if specified data is not disclosed to the user computer until the transaction closes. In other words, for the service provider, maintaining opacity is a contract requirement if the discounted price is to be offered. However, the contracts governing these transactions normally permit disclosure of at least some hotel identifying information to user computers or accounts that are within closed user groups, that is, groups of users with special or definable characteristics. The present inventors have discovered, in an inventive moment, that dynamic identification of metadata attributes pertaining to a particular user computer or account is useful to define a closed user group consisting of all users having those same metadata attributes, and in response, selected information in an opaque or semi-opaque transaction may be communicated to the user computer without legal exposure and while simultaneously achieving the technical benefits noted above relating to use of bandwidth, memory, and CPU resources. Closed user groups may be defined, using appropriate programming, as strategic groups based upon loyalty programs, free products, or an offer of lower pricing for users who are signed in to an established account; secondary groups based for example upon a prior stay elsewhere in the same city; and algorithmic groups that are dynamically created using programming as further described herein.

2.0 Example System for Unlocking Opaque Transactions

FIG. 1 illustrates an example networked data processing system that may be used in an embodiment and is configured to unlock opaque transactions.

In an embodiment, user computer 102 may be coupled through one or more wireline networks 106 to a server computer 110 that comprises logic configured to implement the process described herein. A user mobile computing device 104 may be coupled through one or more wireless networks 108 to wireline networks 106 and thus to the server computer 110. Wireline networks 106 may comprise one or more local area networks, wide area networks, internetworks or internets. Wireless networks 108 may comprise one or more radiofrequency, microwave or satellite links.

In an embodiment, end user computer 102, 104 is associated with an end user who is interested in obtaining information about the properties in database 120; for example, the end user may be interested in evaluating the property for a possible hotel stay. End user computers 102, 104 may be any of a mobile computing device such as a smartphone or tablet computer, laptop computer, desktop computer or other computing device. In some cases the end user computer 102, 104 has been used previously to complete one or more transactions with the server computer 110.

Server computer 110 represents one among one or more computers typically located in a commercial-class data center including any of a virtual data center, cloud service provider, or enterprise data center. Server computer 110 may collectively represent one of numerous instances of virtualized processing elements and in a practical commercial embodiment sufficient computing resources may be implemented to service thousands or millions of client computers. The server computer 110 may be implemented as any number of distributed, clustered, or redundant server machines for load balancing or capacity purposes.

In an embodiment, server computer 110 comprises presentation logic 112 coupled to libraries and support services 119; property offer logic 114 coupled to dynamic attribute logic 118, a property database 120, and the libraries and support services; and property management logic 116 coupled to the property database and the libraries and support services. The dynamic attribute logic 118 may be coupled also to the property database 120. Each of these elements is described in subsequent sections.

Server computer 110 may be coupled to one or more databases 120 that store item data for a large number of items. Database 120 comprises any one or more of a relational database, object store, or filesystem capable of storing property data defining properties, user data, transaction data and the like. In an embodiment, database 120 may essentially function as a catalog or directory of a large number of properties that property offer logic 114 can offer to end user computers 102, 104 for browsing, inquiry, purchase or booking. Further, database 120 is configured to store metadata describing users, accounts or user machines, and transaction data relating to past transactions in which users have participated. For example, database 120 may store historic transaction data in which records relate to transactions and one or more fields of a record identify a user, account or machine that initiated the transaction. In the context of hotel bookings, the database 120 may be configured to store a history of all bookings in which a particular user account participated so that the system of FIG. 1 effectively knows or stores data about the locations, particular hotel or other properties, dates of stays, and related information pertaining the bookings.

In an embodiment, server computer 110 comprises an HTTP server optionally integrated with presentation logic 112 that is configured to dynamically form and serve HTML documents or other web content to client browsers at the computers 102, 104 as part of delivering information services to the computers. In an embodiment, the HTTP server and presentation logic 112 may be accessed from end user computer 102, 104 using an HTTP browser to receive pages or screens.

Server computer 110 may further comprise property offer logic 114 that is configured to query data from property database 120, apply business rules or analytics processes, and select or determine properties to offer to users. Dynamic attribute logic 118 may be coupled to property offer logic 114 and is configured to select and offer properties based upon a user-specified attribute of an item, which may change over time, of one of the computers 102, 104.

In some embodiments, the property offer logic 114 is further configured to selectively unlock one or more opaque, semi-opaque, or retail transactions or "deals". The property offer logic 114 may be configured to define one or more closed user groups, determine eligibility of user for a particular closed user group, and unlock one or more offers based on the eligibility. Each of these operations may be implemented using one or more methods, procedures, programs, other software elements, or other forms of programmed logic, and data defining groups, eligibility, offers and properties of offers may be stored in tables of database 120. "Unlock," in this context, means to generate and cause displaying data relating to an offer or transaction that normally is concealed or not displayed; in other words, an unlocked transaction is not fully opaque, and may include even more information than a semi-opaque transaction normally does. Consequently, a user computer receiving data about unlocked transactions receives more data about the transaction than normal, and completing the transaction typically involves fewer network messages, allocation of less memory and/or use of fewer CPU cycles because the user computer has more information and can conclude the transaction more rapidly.

Each of the closed user groups can be defined in a number of ways, including, but not limited to, based on known characteristics of the user and previous transactions initiated by the user. For example, a particular account may be placed within a specified closed user group in response to a real-time determination of:

1. The user account previously booked and completed a transaction pertaining to the same item, such as a hotel.

2. The user account previously completed another transaction of the same type as the type of the transaction that the user account is currently investigating.

3. The user account previously purchased another travel item of a different type that has a relationship to the subject of the unlocked transaction. An example is purchasing an airline flight to a particular city, and the unlocked transaction relates to a hotel in that city.

4. The user account contains data specifying a demographic characteristic.

5. The user account is associated with a historic stored search query in a search history record in memory, having particular search content.

6. The user account was previously sent an email or other electronic message including a link to a webpage.

7. The user account is marked as participating in a particular loyalty program.

8. The user account, if placed in a specified closed user group, would assist the server computer 110 in achieving a specified goal, such as number of transactions, value of transactions, margin on transactions, etc.

9. The user account has initiated a search for items that represent excess inventory or inventory that is approaching a stale state.

A deal that is unlocked may have terms that are different from an original offer in one or more ways by, for example, providing additional information about the deal that is not normally available to the user computer, by offering a discount, by offering different terms (for example, a more flexible cancellation policy), and/or by offering an additional good or service for free or a reduced price (for example, travel insurance, a rental car waiver, a product included in a cross-sell offer, or a microchip based luggage locator).

Server computer 110 may further comprise property management logic 116, which is configured to receive data from user computers that defines the identity, amenities, images, and other data for properties in database 120. For example, in one embodiment certain administrative users who own, operate, license, are employed by, or are otherwise affiliated with properties may connect computers to property management logic 116 to define properties and upload images, descriptions and other data pertaining to properties to be offered by the server computer 110, or its services, to end users of the properties. In one embodiment, the property management logic 116 is configured to provide a graphical user interface to a property manager computer, including authentication functions and image uploading and reviewing functions. In an embodiment, a property manager computer may contact server computer 110, log in or provide security credentials, and define or configure one or more properties such as hotels in database 120. Thus, the property manager computer may be responsible for managing an inventory of properties in database 120 that the server computer 110 is to offer to end user computers 102, 104 for booking or other functions.

Server computer 110 may further comprise libraries and support services 119 that may implement foundation services in support of the other logical elements, such as database interfaces, managing object models and schemas, logging, and other functions. Each of the elements of server computer 110 may be implemented using one or more computer programs, other software elements, firmware or a combination thereof, in various embodiments. For example, some of the processes herein may be implemented using programs, scripts, and other software elements at the server computer 110 that provide an online property booking service that is accessible using browsers or apps that are compatible with a network communication protocol such as HTTP. For purposes of illustrating clear examples, the description herein assumes that the items are physical properties, such as hotels. Thus, FIG. 1 may be implemented in the context of a hotel search and booking service that enables the computing device to search for, evaluate, select, and complete reservations or bookings for hotels. In other embodiments, the items may be any of accommodations other than hotels; airline flights; rental cars; restaurants; or any other commodity of commerce, product or service.

For purposes of illustrating a clear example, FIG. 1 shows one instance of the end user computers 102, 104, server computer 110, elements within the server computer, and networking elements. In various embodiments, any number of such units may be used, and this disclosure specifically contemplates the use of multiple distributed computing units to implement server computer 110 for the purpose of servicing up to millions of end user computers 102, 104 and tens of thousands of properties in database 120.

In an embodiment, users or customers can participate in opaque or semi-opaque transactions to book the use of an item, or purchase an item, based on identifying a particular attribute of the item that is important to the user or customer, and a minimum satisfactory value for that attribute. User input also may provide values for one or more other attributes, and a desired transaction price. In response, a computer-based system determines one or more items that match or exceed the value for the specified attribute.

In one approach using an opaque transaction model, only one item is selected, and that item may have been pre-selected for the item attribute value based on business rules, deal rules, or other arrangements such that the system pre-stores data which defines in advance which single property will be offered for a given combination of price, general location or geographic zone, and attribute value. Alternatively, the process may use a semi-opaque transaction model in which the pre-selected item is identified and a database query also retrieves one or more other items that match or exceed the user-specified value for the attribute; the user account or computer is then informed that the booked or purchased item will be one of the resulting two or more items, which are not identified by name. The user account or computer may complete a booking or purchase transaction by agreeing to proceed.

Using these techniques, user accounts or computers may provide any dynamic assemblage of traits of items that then defines a pool of possible items that are available for booking or purchase. In the case of hotels, for example, the user account or computer could provide input that effectively communicates, "I'm willing to stay anywhere in New York as long as the property is good for romantic travel," or "I'm willing to stay at a hotel at any star level as long as it has a user rating of at least 8.0." The user account or computer specifies attributes of a possible transaction, then chooses a price and the computer-based processes described herein are capable of completing a booking of the user account or computer for a matching item, albeit without revealing the name and specific address of the booked or purchased item until after payment is complete.

In one embodiment, values for item attributes may be specified in a graphical user interface using a slider widget to increase or decrease a specified value, and the interface may dynamically update in response to changes in the value to indicate general locations of matching items in a graphical map. In this manner, the user account or computer can receive data and screen displays indicating the effect that changing values of item attributes has on the pool of available items, and can rapidly provide data to enter different item attribute values.

3.0 Example Methods for Unlocking Opaque Transactions

Figure 2:
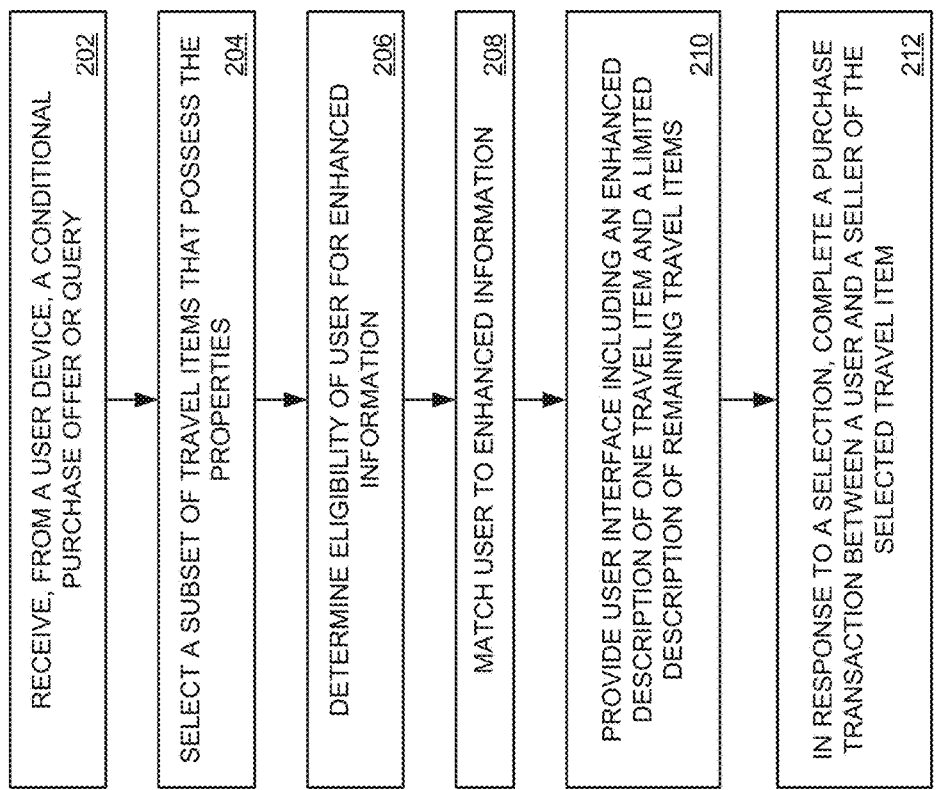
FIG. 2 illustrates an example process for selectively unlocking an opaque transaction for specified user groups.

FIG. 2 illustrates an example process for selectively unlocking an opaque transaction for specified user groups. The process can be perform by one or more of the logic units within the server computer 110. In an embodiment, property offer logic 114, property management logic 116, and dynamic attribute logic 118 are programmed to cooperate in implementing the operations of FIG. 2. For purposes of illustrating clear examples, the operations of FIG. 2 are described herein with reference to FIG. 1, but the broad process of FIG. 2 may be implemented using other arrangements of computers.

In an operation 202, either a search query or a conditional purchase offer is received from a user device, such as user computer 102 or user mobile computing device 104, via a network, such as networks 106, 108. The search query may specify a city or region, dates of stay, star rating, or other criteria. The conditional purchase offer comprises one or more sets of digital data representing an offer to purchase a travel item such as a hotel reservation, an airline ticket, or a car rental. The conditional purchase offer includes one or more characteristics of the travel item that the user desires. The characteristics describe the terms of the conditional purchase offer. Example characteristics include, but are not limited to, a destination location, date(s) or duration, star level, and amenities. Conditional purchase offers may be defined, for example, via user input to a graphical user interface that is displayed by an application program or app that is hosted or executed by user computer 102 or user mobile computing device 104. The conditional purchase offer may be transformed into a parameterized URL that is communicated via HTTP to the HTTP server of the presentation logic 112 on the server side.

In an operation 204, a subset of available travel items is selected from the set of available travel items using the property offer logic 114. The subset is selected based on characteristics included in the conditional purchase offer or based upon parameters in the search query. In embodiments where the user is associated with a user profile or has previously purchased travel items via the server computer 110, this information is also used. For example, if a user previously purchased a travel item, the travel item can be included in the subset. Further, if the user has reviewed the travel item favorably, the travel item can be included while if the user has reviewed the travel item unfavorably, that travel item may be excluded from the set.

Results of the search query may be provided, in one embodiment, to an identification engine that is programmed or configured to determine eligibility of the user account or user computer for a closed user group. In an operation 206, eligibility of the user for receiving enhanced information is determined by the property offer logic 114. The enhanced information can include the identity of the seller, a different contractual term in the event the user purchases the travel item, a discounted price on the travel item or a related travel item, a free related travel item (for example, travel insurance), or the like. In one embodiment, eligibility of the user is determined according one or more gate definitions that serve as initial definitions of closed user groups. Closed user groups may comprise a number of users who each have a common characteristic such as a demographic characteristic, a search query stored in a search history record in memory, a transaction stored in a transaction history record, or having received an email (or other electronic message) including a link to a webpage provided by the server computer 110. In some instances, the closed user group can be one of three types: loyalty programs for returning users, manually defined groups to achieve a business target, or algorithmically defined based on, for example, existing inventory.

In some embodiments, definitions of the closed user groups are determined by the property offer logic 114 based on one or more metrics that may be passively obtained from network communications with the user computer or user account, or learned by the service and/or augmented over time via other interactions with the same user computer or user account. For example, URLs received from a browser hosted on the user computer may include values of metrics. The metrics can include a user agent identifier, latitude and longitude values for a geographical location of the user, a referrer header, a page identifier, a path identifier, a traffic source, a monetary currency in which the user will pay for the purchase, and an Internet Protocol (IP) address of the user. The IP address can further be used to infer a geographical location of the user. Some devices may provide a global unique identifier (GUID) or universal unique identifier (UUID) of the user computing device. The metrics that are passively obtained via the browser may be augmented with other metadata that is possessed only by the service provider that is implementing FIG. 2. For example, past interactions with the same user account may include a session identifier that is received again at the time of a request for a property. Past interactions also may yield emails sent by or received by the user that relate to the travel service provider and that can be mined for values that indicate eligibility for a closed user group. Past interactions may be inferred from a purchase history of the user. Using these metrics, the property offer logic 114, can augment pre-defined gate definitions of the closed user groups to match users, as described in connection with the operation 208.

In an operation 208, the user is matched to a program that is configured to provide particular enhanced information based on the determined eligibility by the property offer logic 114. "Program," in the context of operation 208, refers to a set of logic with multiple steps that are configured to alter the appearance of a graphical user interface on the user computing device to provide enhanced information in a specific way, or to perform other computational steps or configuration steps within the service provider to enable the user account or user computing device to obtain a particular type of deal that otherwise would be unavailable. For example, using various programs, the enhanced information can be further modified by including an indication that the user is receiving enhanced information, an explanation of why the user was selected to receive the enhanced information, or a time duration during which the enhanced information is available to the user.

In an operation 210, the matched program of the operation 208 is executed by generating and providing a user interface to the user device by the HTTP server—presentation logic 112. The user interface includes an enhanced description, including the enhanced information, of at least one of the travel items in the subset and a limited description that does not include enhanced information of any remaining travel items in the subset. In some embodiments, travel items displayed with limited information are referred to as "locked transactions", and travel items displayed with enhanced information are referred to as "unlocked transactions". Specific user interfaces are discussed below.

In an operation 212, in response to a selection of a travel item received from the user device, the server computer 110 causes completion of a purchase transaction between the user and the seller of the selected travel item to be completed.

In some opaque transactions, where the seller of the travel items are not identified prior to purchase, the enhanced information for a particular travel item can identify the seller of that travel item. The seller can be identified, if, for example, the user has previously purchased a travel item from the seller. If the user again selects the same travel item (with enhanced information), the server computer 110 can infer that the user has a positive sentiment towards the travel item. If the identity of the seller is exposed to the user, and the user does not purchase the travel item, the server computer 110 can infer that the user has a negative sentiment towards the travel item. Based on the identified sentiment, the property offer logic 114 can include or exclude the travel item or enhanced information in response to future requests from the user.

3.1 Example Unlocked Semi-Opaque or Opaque Transaction

Figure 3:
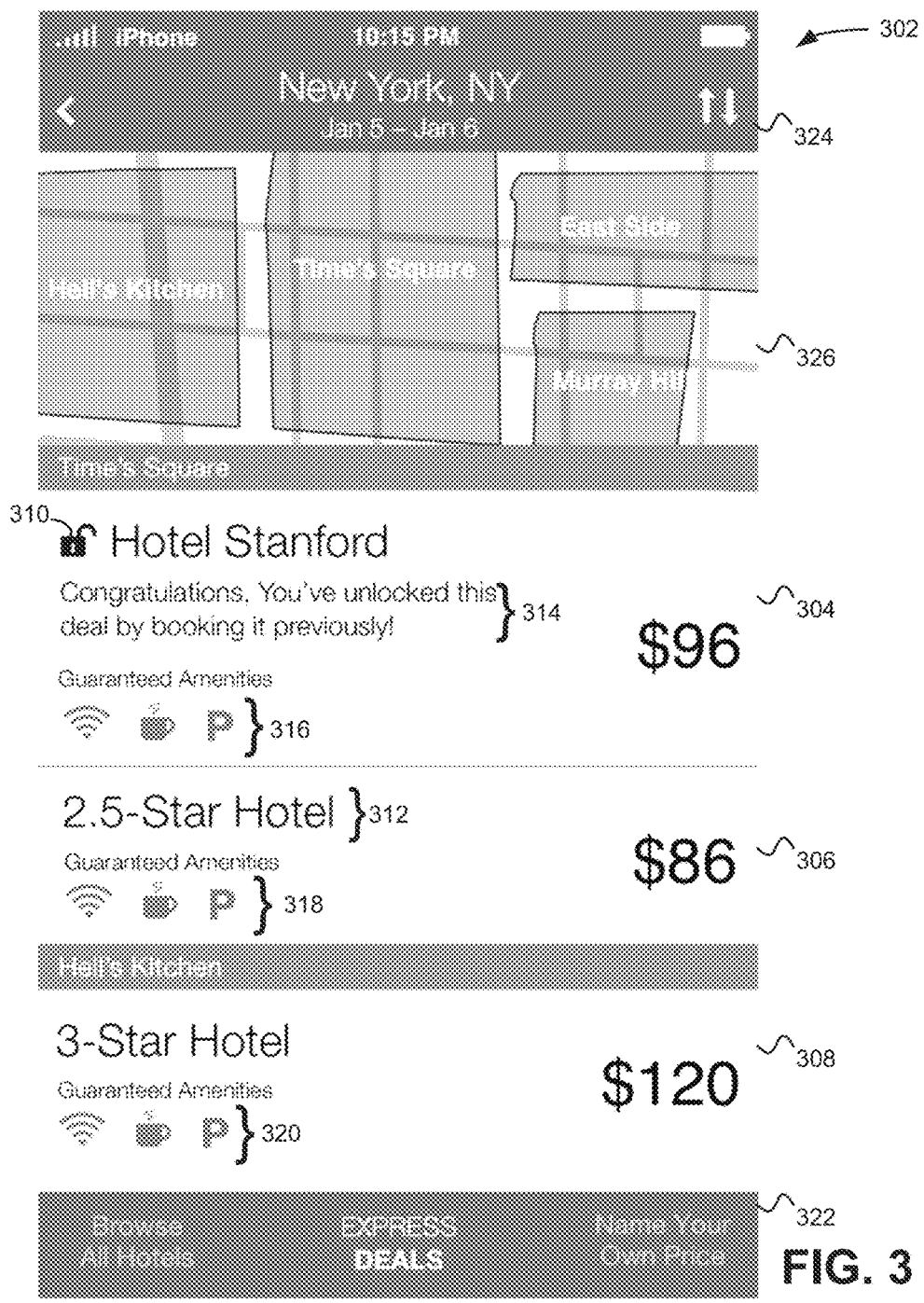
FIG. 3 illustrates a first example graphical user interface as displayed on a mobile computing device and depicting an unlocked transaction for a specified user group.
Figure 4:
FIG. 4 illustrates a second example graphical user interface as displayed on a mobile computing device and depicting an unlocked transaction for a specified user group.
Figure 5:
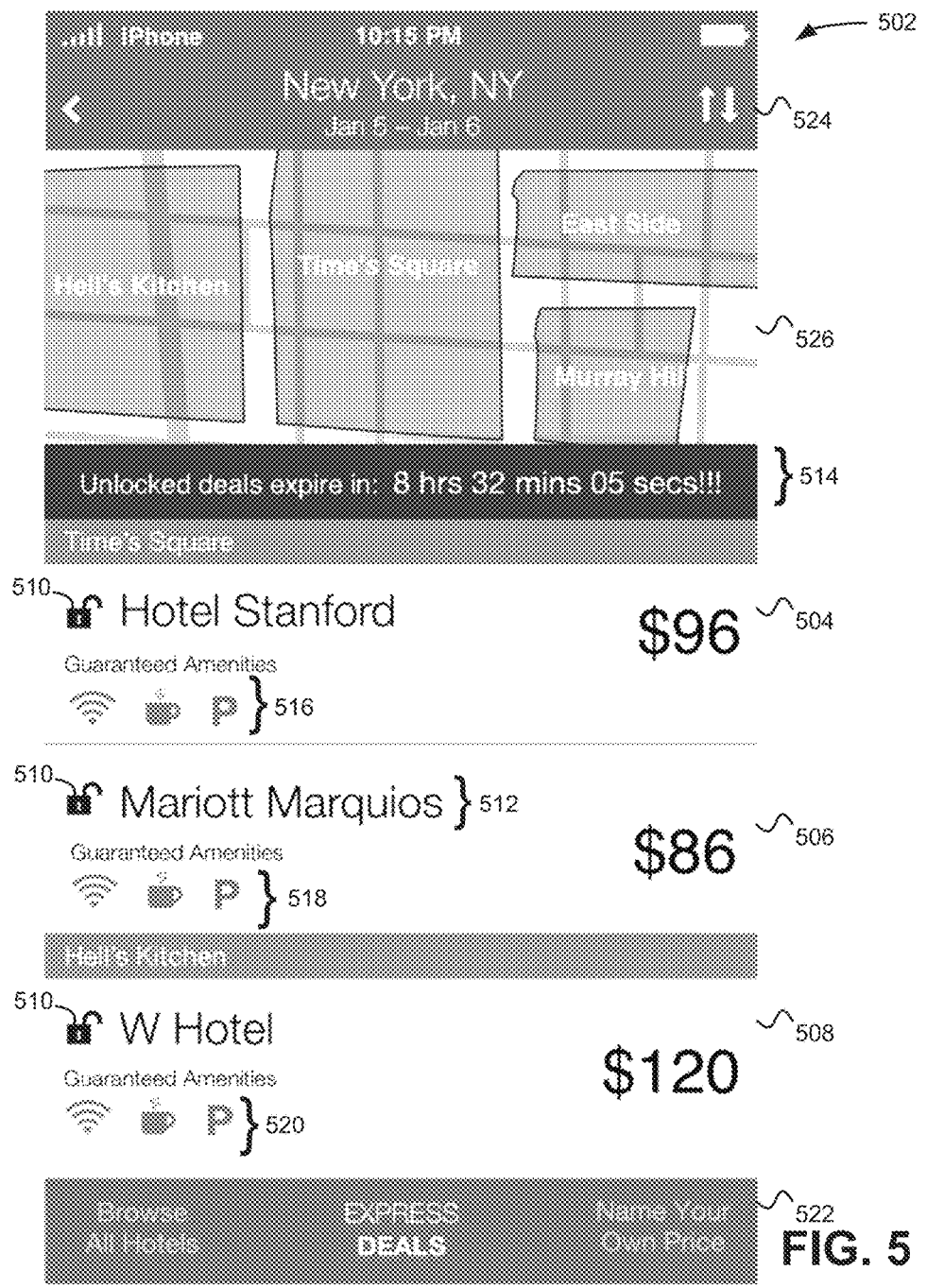
FIG. 5 illustrates a third example graphical user interface as displayed on a mobile computing device and depicting an unlocked transaction for a specified user group.
Figure 6:
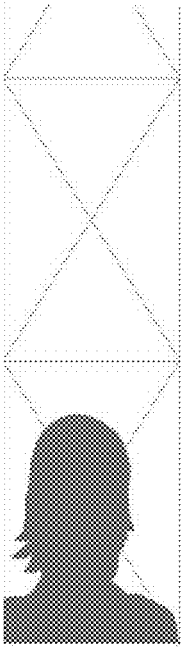
FIG. 6 illustrates a fourth example graphical user interface as displayed on a mobile computing device and depicting an unlocked transaction for a specified user group, in a portion of a scrolled list.
Figures 7A, 7B:
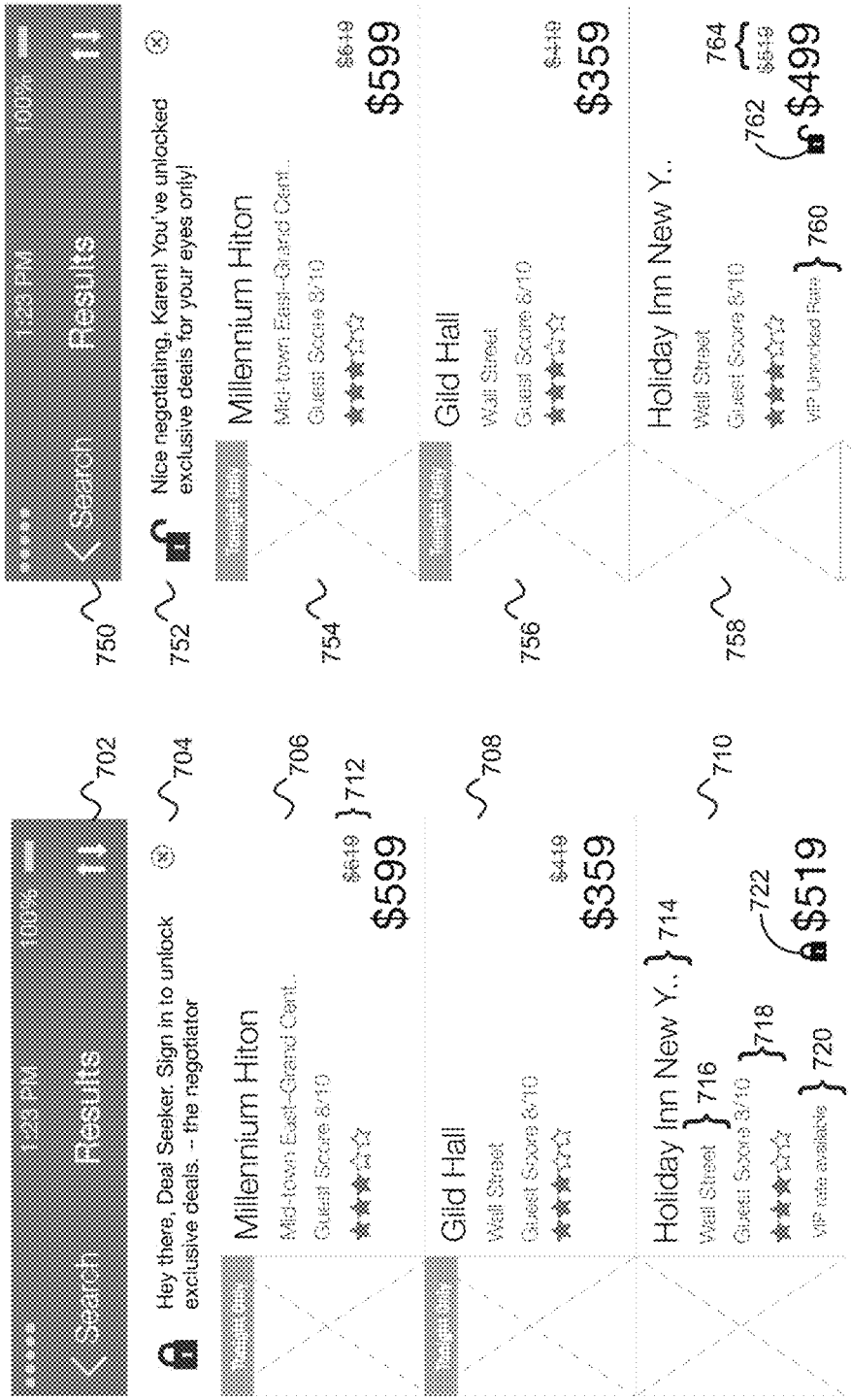
FIG. 7A, FIG. 7B each illustrates other example graphical user interfaces as displayed on a mobile computing device and depicting an unlocked transaction for a specified user group.
Figure 8:
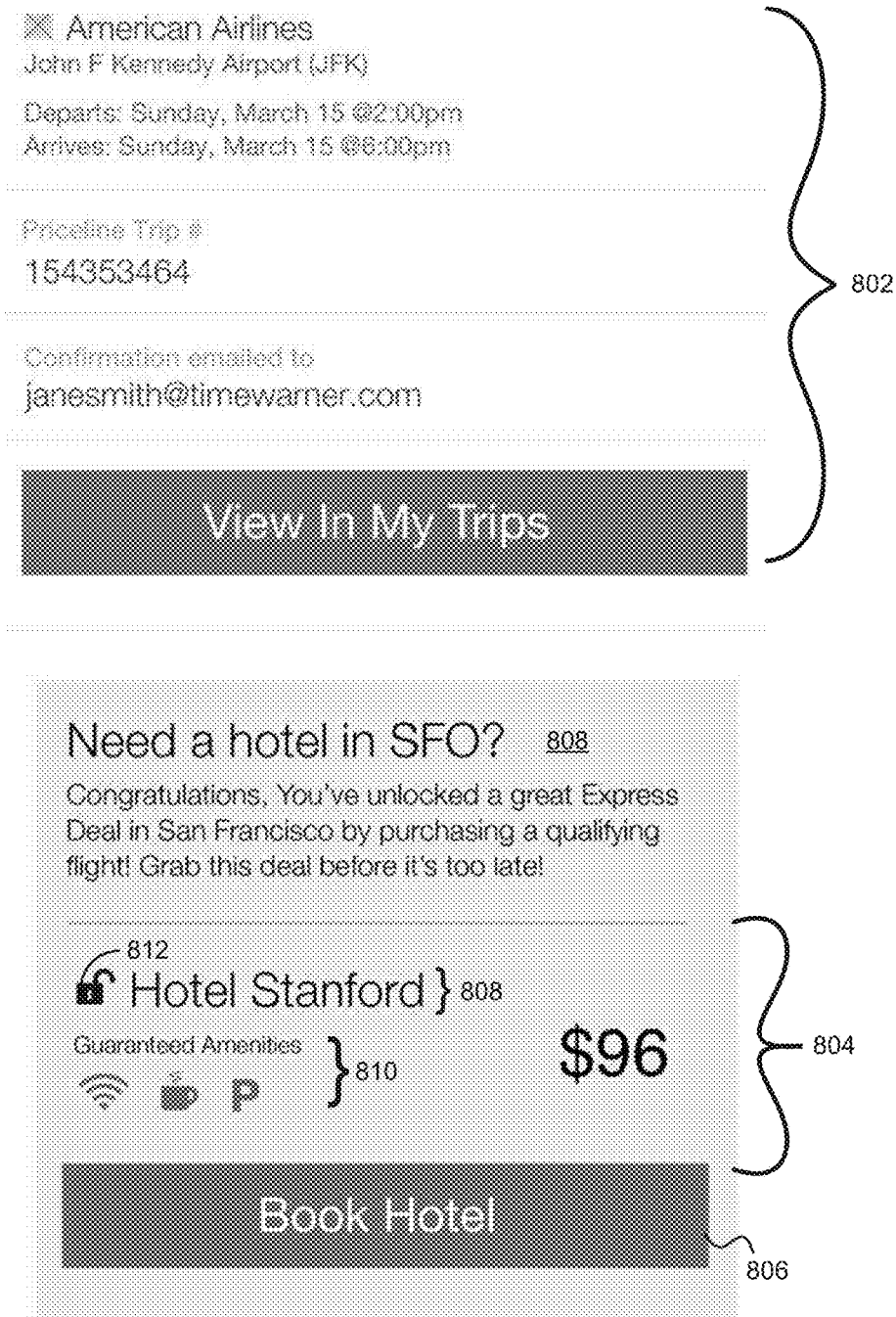
FIG. 8 illustrates another example user interface depicting an unlocked transaction for a specified user group.

FIG. 3 illustrates a first example graphical user interface as displayed on a mobile computing device and depicting an unlocked transaction for a specified user group. FIG. 4 illustrates a second example graphical user interface as displayed on a mobile computing device and depicting an unlocked transaction for a specified user group. FIG. 5 illustrates a third example graphical user interface as displayed on a mobile computing device and depicting an unlocked transaction for a specified user group. FIG. 6 illustrates a fourth example graphical user interface as displayed on a mobile computing device and depicting an unlocked transaction for a specified user group, in a portion of a scrolled list. FIG. 7A, FIG. 7B each illustrates other example graphical user interfaces as displayed on a mobile computing device and depicting an unlocked transaction for a specified user group. FIG. 8 illustrates another example user interface depicting an unlocked transaction for a specified user group.

Referring first to FIG. 3, in an embodiment, a user interface display 302 may be provided to user mobile computing device 104 after the property offer logic 114 has determined that the user is a member of a closed user group eligible to receive enhanced information and has matched the user to the enhanced information. In an embodiment, display 302 comprises a top bar 324, map 326, a plurality of item tiles 304, 306, 308, and a function bar 322. Each of the item tiles 304, 306, 308 comprises an item name, price, and one or more amenity icons 316, 318, 320. For example, item tile 306 comprises an item name 312 specified as "2.5-Star Hotel," indicating opacity, and amenity icons 318 indicating, for example, wireless networking, free coffee, free parking. A price per night, $86 in the case of item tile 306, also is displayed in association with each item tile.

In the depicted embodiment, the closed user group is defined as those users who have previously booked a room at the same hotel. The interface includes an explanation as to why the deal is unlocked and the enhanced information is provided. In the depicted embodiment, the enhanced information comprises the identity of the seller, "Hotel Stanford". Therefore, item tile 304 further comprises an unlock icon 310 indicating that the offer has been unlocked, and a message 314 stating why the server computer 110 unlocked the offer. In the depicted embodiment, the remaining sellers for item tiles 306, 308 are not identified and are instead described by their star rating.

In FIG. 3, if the user again selects the "Hotel Stanford," the server computer 110 is configured to store a record indicating that the user views the "Hotel Stanford" favorably. Using this information, the property offer logic 114 is configured to continue to present the "Hotel Stanford" to the user. If, however, the user does not select the "Hotel Stanford" and instead purchases a hotel room from another seller, the server computer 110 is configured to store a record indicating the user views the "Hotel Stanford" unfavorably. Using this information, the property offer logic 114 is configured to cease presenting the "Hotel Stanford" to the user or feature the "Hotel Stanford" less prominently in user interfaces.

FIG. 4 is an example of a user interface that may be provided to a mobile device (for example, user mobile computing device 104) after the property offer logic 114 has determined that the user is a member of a closed user group eligible to receive enhanced information and has matched the user to the enhanced information. In an embodiment, display 402 comprises a top bar 424, a map 426, a plurality of item tiles 404, 406, 408, and a function bar 422. Each of the item tiles 404, 406, 408 comprises an item name, price, and one or more amenity icons 416, 418, 420. For example, item tile 406 comprises an item name 412 specified as "2.5-Star Hotel," indicating opacity, and amenity icons 418 indicating, for example, wireless networking, free coffee, free parking. A price per night, $86 in the case of item tile 406, also is displayed in association with each item tile.

In the depicted embodiment, the closed user group is defined as those users who have previously booked a hotel room via a retail website but who have not yet purchased a hotel room via a semi-opaque or opaque transaction and who have looked at a predefined number of hotels in the same city. The interface of FIG. 4 includes an explanation as to why the deal is unlocked and the enhanced information is provided. In the depicted embodiment, the enhanced information comprises the identity of the seller, "Hotel Stanford". Therefore, item tile 404 further comprises an unlock icon 410 indicating that the offer has been unlocked, and is adjacent to a message 414 stating why the server computer 110 unlocked the offer. In the depicted embodiment, the remaining sellers 406, 408 are not identified and are instead described by their star rating.

FIG. 5 is an example of a user interface that may be provided to a mobile device (for example, user mobile computing device 104) after the property offer logic 114 has determined that the user is a member of a closed user group eligible to receive enhanced information and has matched the user to the enhanced information. In an embodiment, display 502 comprises a top bar 524, map 526, a plurality of item tiles 504, 506, 508, and a function bar 522. Each of the item tiles 504, 506, 508 comprises an item name, price, and one or more amenity icons 516, 518, 520. For example, item tile 506 comprises an item name 512 specified as "2.5-Star Hotel," indicating opacity, and amenity icons 518 indicating, for example, wireless networking, free coffee, free parking. A price per night, $86 in the case of item tile 506, also is displayed in association with each item tile.

In the depicted embodiment, the closed user group is defined as those users who have received an email or a coupon code. The interface of FIG. 5 does not include an explanation as to why the deal is unlocked and the enhanced information is provided. In the depicted embodiment, the enhanced information comprises the identity of all of the sellers. Therefore, item tiles 504, 506, 508 further comprise an unlock icon 510 indicating that the offer has been unlocked. In this instance, the unlocked deals are associated with an expiration depicted as message 514, after which the enhanced information is no longer available to the user.

3.2 Example Unlocked Retail Transaction

FIG. 6 is an example user interface that may be provided to a user mobile computing device 104 after the property offer logic 114 has determined that the user is a member of a closed user group eligible to receive enhanced information and has matched the user to the enhanced information. In an embodiment, display 602 comprises a plurality of item tiles 604, 606, 608, 610. Each of the item tiles 604, 606, 608, 610 comprises a seller's name, a geographic location (e.g., a neighborhood or area of a city), price, and a guest score. For example, item tile 606 comprises an item name 612 specified as "Hotel Stanford," an unlock icon 614, a textual message 616 indicating that the price is an "unlocked" deal, a location identifier 618 indicating that the hotel is in the "Soho-Tribeca" area of New York City, and rating information 620.

As depicted, the rating information can include a guest score and a star level of the hotel. A price per night, $220 in the case of item tile 606, also is displayed in association with each item tile. Some item tiles, such as item tile 604 can include a "regular price" indication 514 showing a struck-through regular price of the hotel. In these instances, the depicted price is a published price of the hotel room and is available to users not eligible for enhanced information. Some item tiles, such as item tiles 608 and 610, include an inventory indication 624 and 626, respectively, showing a current inventory level.

In the depicted embodiment, the closed user group is defined as those users who are shopping in a retail mode (for example, all of the sellers are identified) who have previously purchased from the seller in an opaque or semi-opaque transaction. Therefore, the item tile 606 includes the unlock icon 614 indicating that the offer has been unlocked. The interface of FIG. 6 does not include an explanation as to why the deal is unlocked and the enhanced information is provided. The enhanced information includes a discounted price on the hotel room. As explained in connection with FIG. 3, the server computer 110 can infer a user's sentiment towards the seller based on whether the user selects the unlocked deal.

FIG. 7A, FIG. 7B are user interfaces that can be presented to the user at the user device when the user has submitted a search for hotel rooms in a retail mode. The retail mode allows a user to view the identity of all of the sellers but typically has higher prices than opaque and semi-opaque transactions. Before the user interface of FIG. 7A is shown to the user, the property offer logic 114 has determined that the user is a member of a closed user group eligible to receive enhanced information and has matched the user to the enhanced information.

In FIG. 7A, a first user interface is depicted that shows a listing of three identified hotels and prices. In an embodiment, the display comprises a top bar 702, and a plurality of item tiles 706, 708, 710. Each of the item tiles 706, 708, 710 comprises an item name (e.g., item name 714 in item tile 710), geographic location (e.g., location 716 in item tile 710), rating information (e.g., rating information 718 including a guest score and a star level in item tile 710), and a price. The price, before unlocking any deals, is a published price, which may be a pre-discounted price (e.g., in item tile 706, the price is less than struck-through price).

In the item tile 710, for "Holiday Inn New Y[ork]", textual message 720 indicates that a VIP rate is available and a lock icon 722 is depicted. At the top of the user interface of FIG. 7A, instructions 704 to "unlock" the price are provided (for example, instructing that the user log in).

In FIG. 7B, after the user has logged in per the instruction 704 of FIG. 7A, the deal is "unlocked", and the user interface is updated. In FIG. 7B, the user interface is depicted as showing the listing of the three identified hotels and prices. In an embodiment, the display comprises a top bar 750, and a plurality of item tiles 754, 756, 758. Like FIG. 7A, each of the item tiles 754, 756, 758 comprises an item name, geographic location, rating information, and a price.

As a result of the user logging in, a message 752 is provided indicating that one or more deals have been unlocked. In the item tile 758, an unlocked icon 762 is shown adjacent to the enhanced information, here, a discounted price. The item tile further includes a textual message 760 indicating that the new price is a VIP unlocked rate. The published price is re-rendered as a struck-through price 764 that is higher than the price indicated by the enhanced information.

3.3 Example Unlocked Cross-Sell

FIG. 8 is an example user interface that may be provided to a mobile device (for example, user mobile computing device 104) after the property offer logic 114 has determined that the user is a member of a closed user group eligible to receive enhanced information and has matched the user to the enhanced information. In FIG. 8, the user interface comprises a description 802 of a purchased travel item. Here, the purchased travel item is a flight from New York City to San Francisco. The user interface further includes item tile 804 comprising an item name 808 specified as "Hotel Stanford," and amenity icons 810 indicating, for example, wireless networking, free coffee, free parking. A price per night, $96 in the case of item tile 804, also is displayed in association with each item tile.

In the depicted embodiment, the closed user group is defined as those users who have previously purchased a related travel item, such as an airline ticket to a destination city within a predefined time period. The interface of FIG. 8 includes an explanation 808 as to why the deal is unlocked and the enhanced information is provided. In the depicted embodiment, the enhanced information comprises the identity of the seller, "Hotel Stanford". Therefore, item tile 804 further comprises an unlock icon 812 indicating that the offer has been unlocked, and is adjacent to a message 808 stating why the server computer 110 unlocked the offer. In the depicted embodiment, one item tile is shown but other embodiments can include multiple item tiles.

4.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
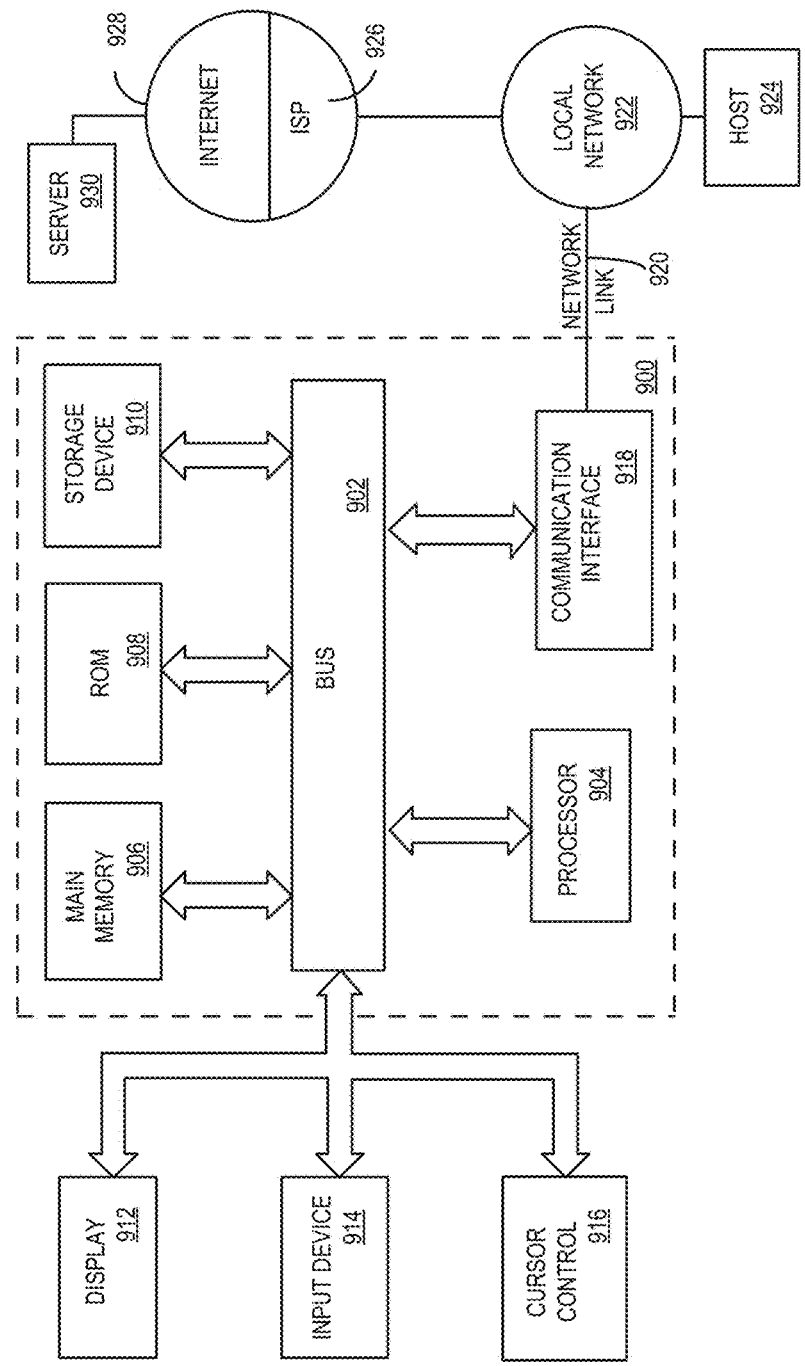
FIG. 9 is a block diagram that illustrates a computer system upon which an embodiment of the invention may be implemented.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (for example, x) and a second axis (for example, y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network, network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. An improved data processing system comprising:
a memory accessible to a server computer configured to maintain a plurality of available travel items and information about a plurality of users, the information comprising records indicating characteristics of a user of the plurality of users and past transactions of a user device associated with the user;
one or more non-transitory data storage media in the server computer storing property offer logic comprising one or more sequences of instructions which when executed cause the server computer to perform:
using the server computer, causing the user device to display a first screen showing one or more properties of travel items that describe terms of a conditional purchase offer;
using the server computer, obtaining, from the user device, a conditional purchase offer to purchase a travel item based on input via the first screen;
using the server computer, accessing the maintained plurality of available travel items from the memory and selecting a subset of travel items of the plurality of available travel items,
each travel item of the subset of travel items having the properties included in the conditional purchase offer,
at least one of the subset of travel items including a travel reservation;
using the server computer, accessing the information about the user from the memory and determining initial eligibility of the user for enhanced information of any of the subset of travel items based on gate definitions describing closed user groups;
using the server computer, selecting a first of the subset of travel items, identifying a type of enhanced information of the first travel item, and determining updated eligibility of the user for the first type of enhanced information of the first travel item based on additional metrics related to current or past network communications or transactions of the user device;
using the server computer, matching the user to one of a plurality of programs for presenting data related to the first type of enhanced information of the first travel item;
using the server computer, causing the user device to display a second screen showing the data related to the first type of enhanced information of the first travel item of the subset of travel items based on the one program matched to the user and limited information not including the first type of enhanced information of at least one of the remaining travel items of the subset of travel items
receiving a selection from the user device of a specific travel item of the subset of travel items based on input via the second screen;
recording the selection of the specific travel item and any display of enhanced information of the specific travel item or the non-selection of at least one of the remaining travel items of the subset of travel items and any display of enhanced information of the at least one travel items as part of the past transactions of the user device.

2. The improved data processing system of claim 1, wherein the gate definitions describe a closed user group that comprises a number of users who each have a common demographic characteristic, submitted a common search query, engaged in a common transaction, or received common email.

3. The improved data processing system of claim 1, wherein the first type of enhanced information comprises an identity of a seller of the first travel item.

4. The improved data processing system of claim 1, wherein the first type of enhanced information comprises a discounted price of the first travel item.

5. The improved data processing system of claim 1, wherein the first type of enhanced information comprises a discounted price of a second travel item related to the first travel item.

6. The improved data processing system of claim 1, wherein the first type of enhanced information comprises a different contractual term of the first travel item.

7. The improved data processing system of claim 1,
wherein the memory is further configured to maintain information about the user including a record of enhanced information previously presented to the user;
wherein determining updated eligibility of the user for the first type of enhanced information of the first travel item comprises:
using the server computer, accessing the information about the past transactions of the user device;
using the server computer, accessing the record of enhanced information of the first travel item;
using the server computer, determining that the user failed to purchase the first travel item;
using the server computer, removing the first travel item from an updated subset of the travel items.

8. The improved data processing system of claim 1,
wherein the memory is further configured to maintain information about the user including a record of enhanced information previously presented to the user;
wherein the determining updated eligibility of the user for the first type of enhanced information of the first travel item comprises:
using the server computer, accessing the information about the past transactions of the user device;
using the server computer, accessing the record of enhanced information of the first travel item;
using the server computer, determining that the user purchased the first travel item;
using the server computer, including the first travel item in subset of the travel items.

9. The system of claim 8, wherein the plurality of programs comprises indicating that the user is receiving enhanced information, an explanation of why the user was selected to receive the enhanced information, or a time duration during which the enhanced information is available to the user.

10. The system of claim 1, wherein the first travel item is one of a hotel reservation, a flight reservation, or a car rental.

11. A non-transitory computer-readable medium having instruction embodied thereon, the instructions, when executed by a server computer cause the server computer to perform:
using the server computer, causing a user device associated with a user to display a first screen showing one or more properties of travel items that describe terms of a conditional purchase offer;
using the server computer, obtaining, from the user device, a conditional purchase offer to purchase a travel item based on input via the first screen;
using the server computer, accessing a maintained plurality of available travel items from a memory and selecting a subset of travel items of the plurality of available travel items,
each travel item of the subset of travel items having the properties included in the conditional purchase offer,
at least one of the subset of travel items including a travel reservation;
using the server computer, accessing information about the user from the memory and determining initial eligibility of the user for enhanced information of any of the subset of travel items based on gate definitions describing closed user groups;
using the server computer, selecting a first of the subset of travel items, identifying a type of enhanced information of the first travel item, and determining updated eligibility of the user for the first type of enhanced information of the first travel item based on additional metrics related to current or past network communications or transactions of the user device;
using the server computer, matching the user to one of a plurality of programs for presenting data related to the first type of enhanced information of the first travel item;
using the server computer, causing the user device to display a second screen showing the data related to the first type of enhanced information of the first travel item of the subset of travel items based on the one program matched to the user and limited information not including the first type of enhanced information of at least one of the remaining travel items of the subset of travel items
receiving a selection from the user device of a specific travel item of the subset of travel items based on input via the second screen;
recording the selection of the specific travel item and any display of enhanced information of the specific travel item or the non-selection of at least one of the remaining travel items of the subset of travel items and any display of enhanced information of the at least one travel items as part of the past transactions of the user device.

12. The non-transitory computer-readable medium of claim 11, wherein the gate definitions describe a closed user group that comprises a number of users who each have a common demographic characteristic, submitted a common search query, engaged in a common transaction, or received common email.

13. The non-transitory computer-readable medium of claim 11, wherein the first type of enhanced information comprises an identity of a seller of the first travel item.

14. The non-transitory computer-readable medium of claim 11, wherein the first type of enhanced information comprises a discounted price of the first travel item.

15. The non-transitory computer-readable medium of claim 11, wherein the first type of enhanced information comprises a discounted price of a second travel item related to the first travel item.

16. The non-transitory computer-readable medium of claim 11, wherein the first type of enhanced information comprises a different contractual term of the first travel item.

17. The non-transitory computer-readable medium of claim 11,
wherein the memory is further configured to maintain information about the user including a record of enhanced information previously presented to the user;
wherein determining updated eligibility of the user for the first type of enhanced information of the first travel item comprises:
using the server computer, accessing the information about the past transactions of the user device;
using the server computer, accessing the record of enhanced information of the first travel item;
using the server computer, determining that the user failed to purchase the first travel item;
using the server computer, removing the first travel item from an updated subset of the travel items.

18. The non-transitory computer-readable medium of claim 11,
wherein the memory is further configured to maintain information about the user including a record of enhanced information previously presented to the user;

wherein determining updated eligibility of the user for the first type of enhanced information of the first travel item comprises:

using the server computer, accessing the information about the past transactions of the user device;

using the server computer, accessing the record of enhanced information of the first travel item;

using the server computer, determining that the user purchased the first travel item;

using the server computer, including the first travel item in subset of the travel items.

19. The non-transitory computer-readable medium of claim 18, wherein the plurality of programs comprises indicating that the user is receiving enhanced information, an explanation of why the user was selected to receive the enhanced information, or a time duration during which the enhanced information is available to the user.

20. The non-transitory computer-readable medium of claim 11, wherein the first travel item is one of a hotel reservation, a flight reservation, or a car rental.

* * * * *